United States Patent
Karguth et al.

(10) Patent No.: US 8,171,186 B1
(45) Date of Patent: May 1, 2012

(54) ON-CHIP INTERCONNECT FABRIC

(75) Inventors: Brian Jason Karguth, Van Alstyne, TX (US); Denis Roland Beaudoin, Rowlett, TX (US); Akila Subramaniam, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/017,824

(22) Filed: Jan. 31, 2011

(51) Int. Cl.
*G06F 13/36* (2006.01)
*G06F 13/00* (2006.01)

(52) U.S. Cl. ............... 710/35; 710/25; 710/58; 710/311; 710/110

(58) Field of Classification Search .............. 710/33–35, 710/22–25, 58–61, 305–311, 110
See application file for complete search history.

(56) References Cited

U.S. PATENT DOCUMENTS

| | | | | |
|---|---|---|---|---|
| 4,954,950 A * | 9/1990 | Freeman et al. | ............... | 709/228 |
| 5,255,375 A * | 10/1993 | Crook et al. | .................. | 710/105 |
| 5,506,995 A * | 4/1996 | Yoshimoto et al. | ........... | 710/107 |
| 5,732,250 A * | 3/1998 | Bates et al. | .................... | 713/600 |
| 5,752,002 A * | 5/1998 | Naidu et al. | .................... | 703/14 |
| 5,777,942 A * | 7/1998 | Dosaka et al. | ........... | 365/230.03 |
| 6,085,261 A * | 7/2000 | McIntyre et al. | ............... | 710/35 |
| 2003/0200359 A1* | 10/2003 | Fernald | ............................ | 710/5 |
| 2004/0098549 A1* | 5/2004 | Dorst | ............................ | 711/167 |

* cited by examiner

*Primary Examiner* — Christopher B Shin
(74) *Attorney, Agent, or Firm* — Robert D. Marshall, Jr.; Wade James Brady, III; Frederick J. Telecky, Jr.

(57) ABSTRACT

A method for performing write transactions in an interconnect fabric is described. A burst write transaction is received by a bridge coupled to a master. The burst transaction is initiated by a command phase that includes a wait state attribute. The bridge is also coupled to a second bus that is coupled to a slave destination device or to another bridge. The bridge may initiate a cut-through transaction to the second bus when the wait state attribute indicates a master inserted wait state will not be incurred during the burst transaction.

20 Claims, 7 Drawing Sheets

ON-CHIP INTERCONNECT FABRIC

FIELD OF THE INVENTION

This invention generally relates to a network of data buses and bridges, and in particular, to networks on a chip.

BACKGROUND OF THE INVENTION

Multiprocessor system-on-chip (SOC) platforms are emerging as an important trend for SOC design. Power and wire design constraints are forcing the adoption of new design methodologies for system-on-chip, namely, those that incorporate modularity and explicit parallelism. Interconnect fabrics, such as networks-on-chip (NoC), may be used to interconnect the multiple processors and other devices included within the SOC. These communication-centric interconnect fabrics are characterized by different trade-offs with regard to latency, throughput, energy dissipation, and silicon area requirements.

Examples of interconnect fabrics that may be used within an SOC include: ARM Inc's AMBA (Advanced Microcontroller Bus Architecture) that defines a multilevel busing system including an AHB (advanced host bus) system bus and an APB (advanced peripheral bus) lower-level peripheral bus; Sonics Inc's proprietary OCP bus, IBM's CoreConnect, Silicore's Wishbone, and Texas Instruments' Common Bus Architecture (CBA).

Most standard bus interfaces claim to support 'precise' bursts, meaning that the length of a transaction can be encoded in the interface signaling at the beginning of a transaction. For standard buses which allow master inserted wait states, a bridge simply implements store and forward or passes the wait states on to the destination side of the bridge.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
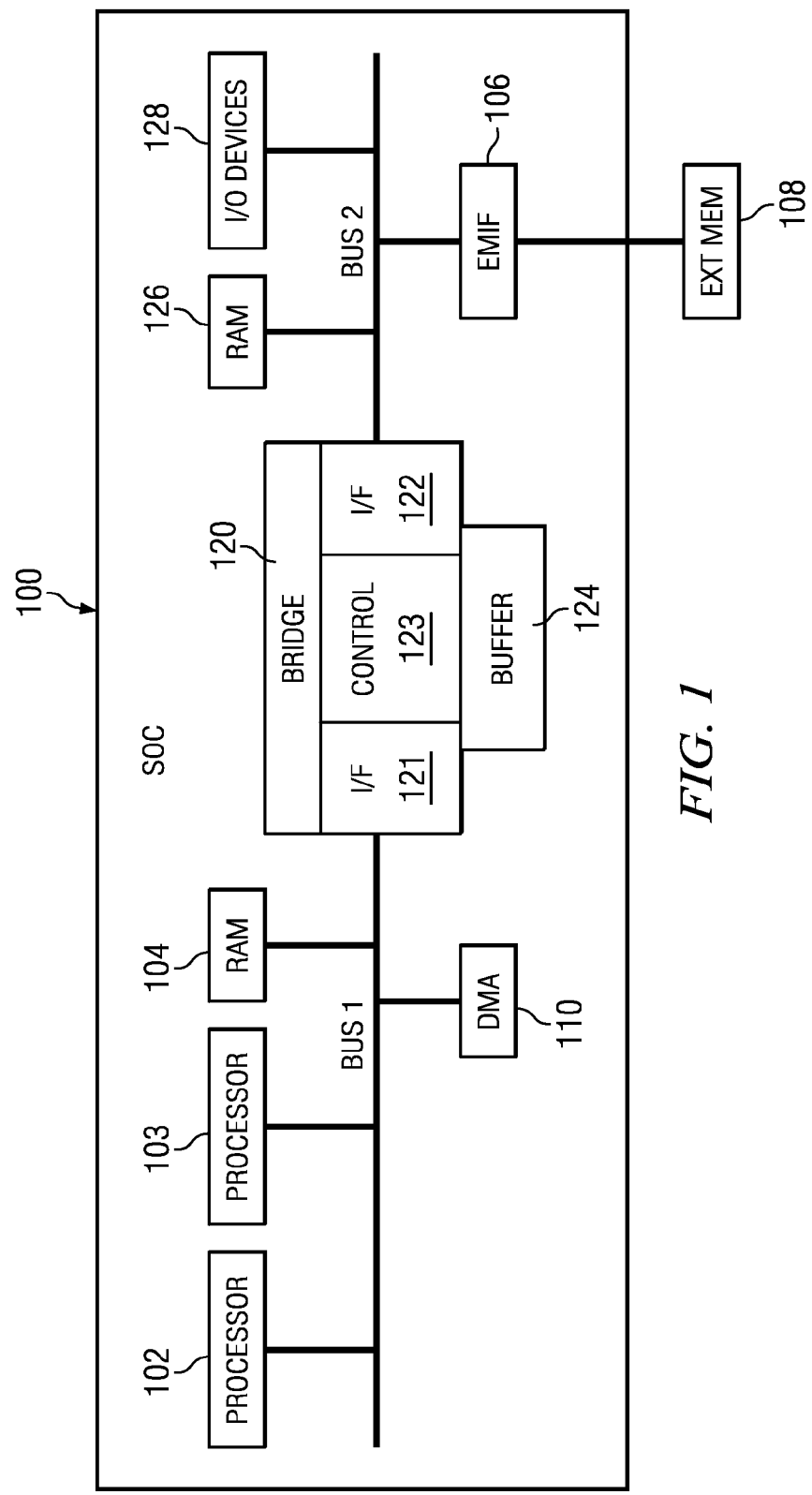
FIG. 1 is a block diagram of a system on a chip (SOC) with an on-chip network illustrative of an embodiment of the present invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As mentioned earlier, most standard bus interfaces claim to support 'precise' bursts, meaning that the length of a transaction can be encoded in the interface signaling at the beginning of a transaction. However, a problem for bridges within an interconnect fabric is that write transactions are not truly precise from a cut-through bridging perspective unless it is also known whether or not there will be any master inserted wait states.

The use of on-chip bus interfaces which allow the master side of the interface to insert wait states on writes may disrupt the natural processing pipeline of certain types of slave attached peripherals, such as an external memory interface (EMIF), peripheral component interconnect (PCI), etc. These disruptions in the pipeline can require a store and forward type buffer to be placed directly in front of the slave peripheral resulting in higher latency and larger area.

Most standard bus interfaces allow master inserted wait states during burst transactions. By using an attribute which travels as a signal along with the transaction it is possible to indicate whether or not each individual transaction will in fact include any master inserted wait states on writes. By modulating this attribute appropriately, it is possible to create systems which completely adhere to the bus standards but which require far less buffering and exhibit lower latency due to cut-through type bridging implemented within the interconnect.

For example, a single bit attribute signal may indicate whether a master inserted wait state may or will not occur during the burst transaction. All endpoint masters in the system would be encouraged to always output transactions without inserting wait states on writes. As a transaction flows from the endpoint master toward the endpoint slave through the interconnect, this attribute may be modulated accordingly by the infrastructure. In some cases it may be advantageous to insert master wait states at a certain node in the interconnect fabric. In these cases, the node bridge would set the wait state attribute to indicate master inserted wait states may occur as the transaction passes through the node.

In other cases, it may be advantageous to have a shared store and forward type buffer which accumulates the write data phases and reconstitutes a wait state free burst. In these cases, the node bridge would set the wait state attribute to indicate no master inserted wait states will occur as the transaction passes through. At any point in the system where this attribute is set, writes will be considered truly precise and optimal cut-through type bridging may be supported.

Performance and area improvements may be achieved when cut-though is enabled. Previous bus interface technologies did not allow masters to insert wait states. Embodiments of this invention allow similar type efficiencies during write transactions while operating across a standard bus interface that does allow master inserted wait states. Write latency is typically not considered by many system architects but due to head of line blocking, it is a critical factor in read latency since the write in many cases must be completed before a read can be processed.

Embodiments of the invention allow an endpoint slave device to perform to its full potential by helping to eliminate a source of 'bubbles' in the transaction processing pipe.

FIG. 1 is a block diagram of a system on a chip (SOC) 100 with an on-chip network illustrative of an embodiment of the present invention. This example is a simple system, illustrating a network fabric divided into bus 1 and bus 2. Bus 1 interconnects processors 102, 103, local RAM (random access memory) 104 and DMA (direct memory access) 110.

Bus 2 interconnects additional RAM 126, EMIF (external memory interface) 106 and a selection of input/output devices 128. EMIF 106 may be coupled to an external memory 108.

A bridge 120 couples bus 2 to bus 1. Bridge interface 121 connects to the address, data, and control signal lines of bus 1, while bridge interface 122 connects to the address, data, and control signal lines of bus 2. Control logic 123 within bridge 120 controls and coordinates the operation of bridge interfaces 121, 122. A buffer 124 may be coupled to bridge interfaces 121, 122 and controlled by control logic 123 to provide store and forward buffering, as will be described in more detail below.

Note that the block diagram is only intended to illustrate generic network fabric concepts and does not show all of the system components such as an arbiter, decoder etc. In this embodiment, bus 1 may support 32, 64, or 128-bit data-bus implementations with a fixed 32-bit address bus. It is a synchronous bus that supports bursts and pipelining of accesses to improve throughput. Bus 2 is a similar bus that supports burst transactions. Bridge interface 121 acts a slave to transactions generated by the master devices on bus 1. Bridge interface 122 then acts as a master on bus 2 in response to transactions received from bus 1 that are destined for slave devices on bus 2.

Bus 1 and bus 2 may operate at different clock rates. Bus 1 supports multiple masters. Various embodiments may use a central arbiter or a distributed arbitration system. The arbiter has the task of determining which master gets to do an access. Every transfer has an address/control phase and a separate data phase. They're both pipelined which allows a master to start the next transfer's arbitration and address phase while finishing the current transfer. The address transfer is always followed by the data phase. In this embodiment, separate uni-directional buses for read and write are used. A slave (memory or peripheral device which accepts a read or write request from a master) may prolong the transfer (add wait states) using a "slave not ready" signal. Similarly, a master may prolong the transfer (add wait states) using a "master not ready" signal.

Both buses support bursts, which can either be of undefined-length or fixed length (4, 8 or 16 beats, for example). There is also, of course, the possibility to do a single transfer (one read or write). In various embodiments, bursts may be performed to a fixed address, such as for FIFO access, increment addresses (in steps of a single increment equal to the size of the access) or wrap where a critical word within a cache line is accessed first. The address from a master may be decoded by a central address decoder that provides a select signal to one of the slaves. Other embodiments may have different types of address decoding, etc.

Figure 2:
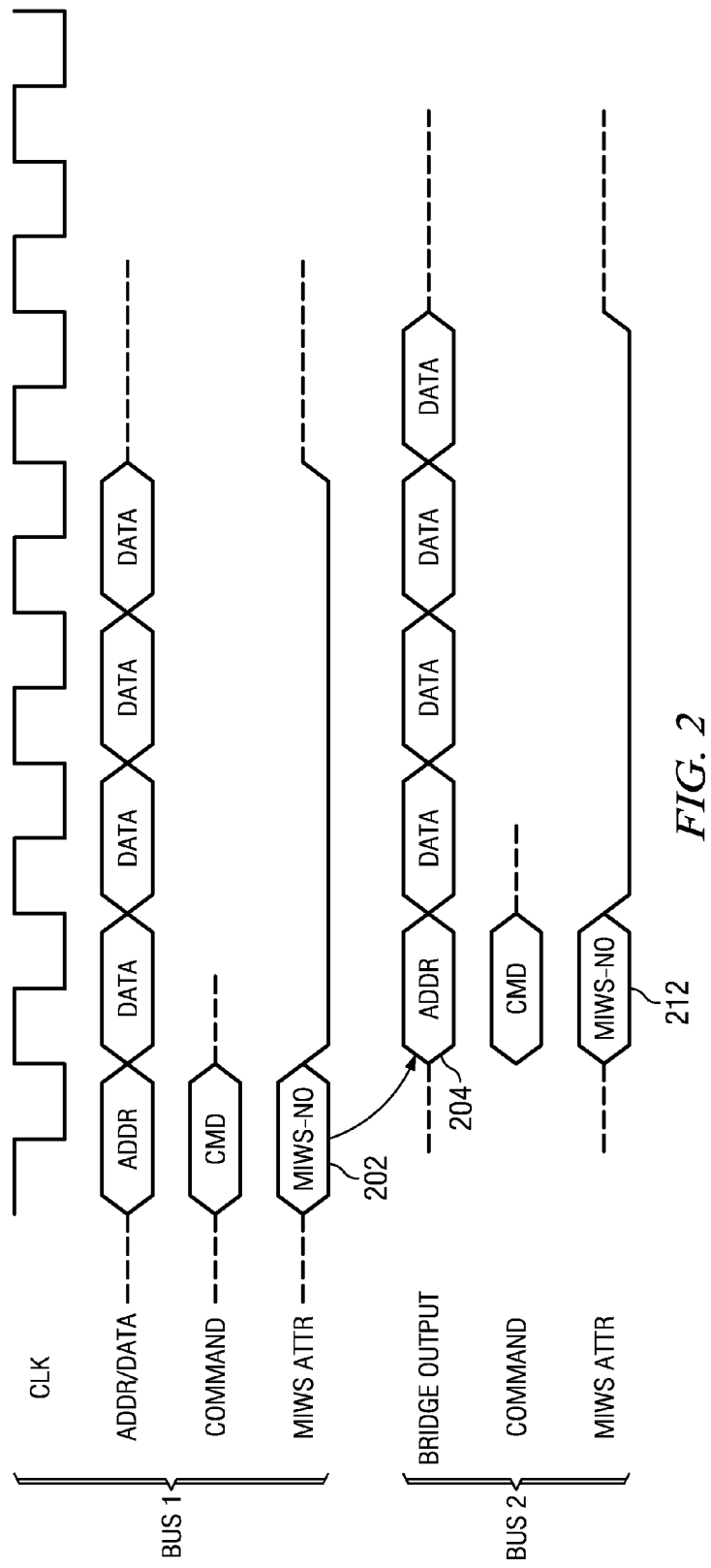
FIGS. 2-3 are timing diagrams illustrating operation of a bridge in the network of FIG. 1.
Figure 3:
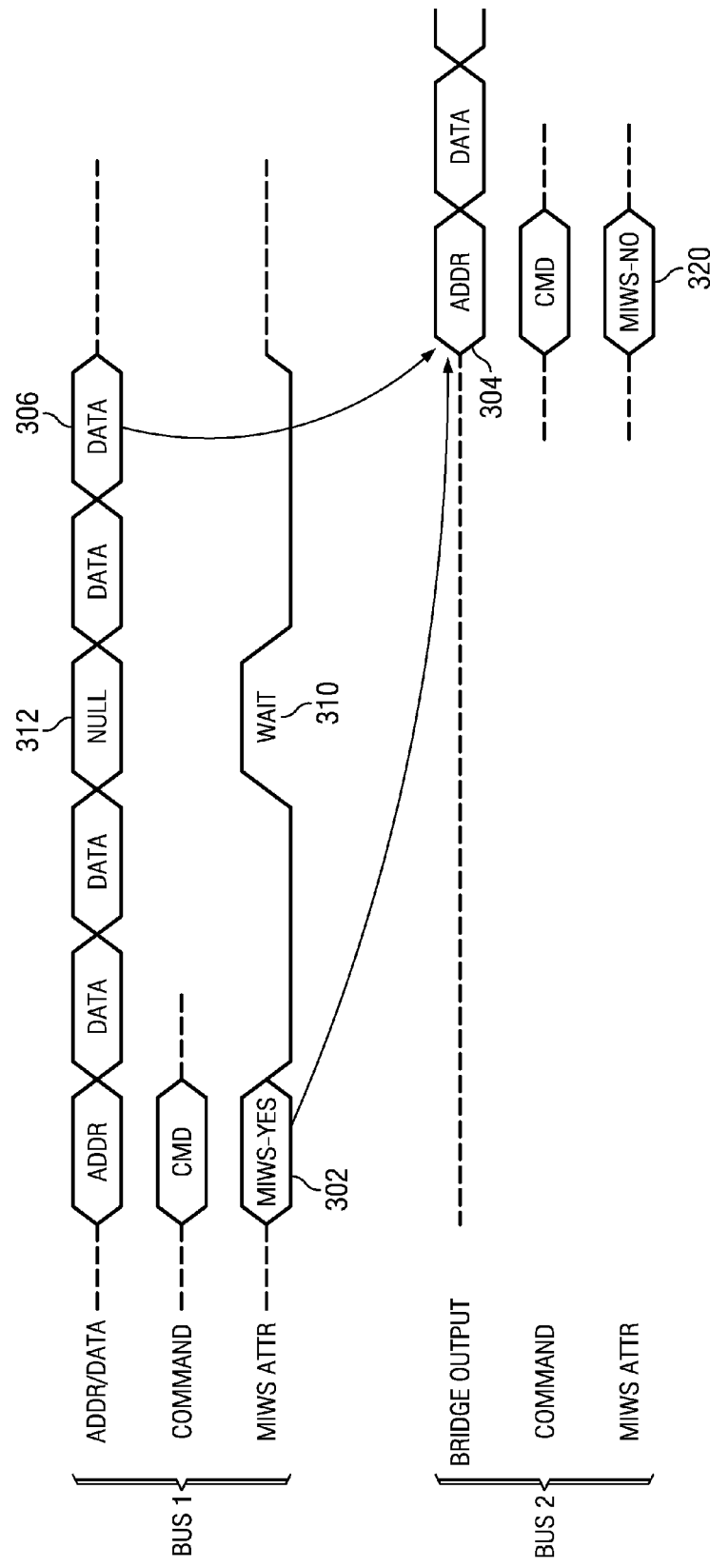

FIGS. 2-3 are timing diagrams illustrating operation of bridge 120 in SOC 100 of FIG. 1. FIGS. 2-3 illustrate a burst write cycle, showing how the burst transaction is divided into an address phase (ADDR), where the master generates the address and control information and a data phase (DATA). In the data phase, data is transferred from the master to the slave. Control information is transferred as a command (CMD) that occurs during the address phase. In this illustration, bridge 120 is receiving a burst transaction from bus 1 and initiating a corresponding burst transaction on bus 2.

A master inserted wait state (MIWS) attribute is also transferred during the address/command phase. The MIWS attribute indicates whether a master inserted wait state may or will not occur during the burst transaction. The master may be implemented in such a fashion that it is always known that it will never insert a master inserted wait state. In that case, the MIWS attribute will always by negative for such a master; each write transfer that it initiates will therefore include a MIWS attribute indicating that a master inserted wait state will not occur during the transaction. Referring back to FIG. 1, processor 102 may be implemented in this manner, for example.

Conversely, for some masters it is known that they may always insert a wait state during a transaction. This may be due to the fact that the source of the write data cannot be accessed by the master fast enough to keep up with the bus burst transfer rate. In that case, the MIWS attribute will always by positive for such a master; each write transfer that it initiates will therefore include a MIWS attribute indicating that a master inserted wait state may occur during the transaction. Referring back to FIG. 1, processor 103 may be implemented in this manner, for example.

For some masters, it is not known ahead of time whether a master inserted wait state may or will not occur during the burst transaction, because different transactions may have different sources of write data. When transferring from one source, the transaction may be accomplished without master inserted wait states, while when transferring from another source master inserted wait states may be needed. In that case, a control function in the master will determine if the block of data can be transferred by the master without incurring a master inserted wait state prior to initiating each burst transaction and the MIWS attribute will be set accordingly on a transaction by transaction basis. Referring back to FIG. 1, DMA 110 may be implemented in this manner, since it may transfer data obtained from different sources.

FIG. 2 illustrates operation of bridge 120 when it receives a transaction from bus 1 in which the MIWS attribute is negative, as indicated at 202. In this case, interface logic 121 receives the burst transaction initiation and the included wait state attribute 202 at the beginning of the burst transaction. Control logic 123 then initiates a cut-through transaction 204 to the second bus since the wait state attribute indicates a master inserted wait state will not be incurred during the burst transaction. Control logic 123 may cause interface logic 122 to set MIWS attribute 212 negative on slave side burst transaction 204 as well. This allows the burst transaction to propagate through the bridge from bus 1 to bus 2 with a minimum of delay.

FIG. 3 illustrates operation of bridge 120 when it receives a transaction from bus 1 in which the MIWS attribute is positive, as indicated at 302. In this case, interface logic 121 receives the burst transaction initiation and the included wait state attribute 302 at the beginning of the burst transaction. Control logic 123 then must wait to initiate the respective burst transaction 304 to the second bus until the last data phase 306 is received, since the wait state attribute indicates a master inserted wait state may be incurred during the burst transaction on any data phase. For example, a wait 310 may be received from the master on data phase 312 when data is not available on that data phase. In this case, store and forward buffer 124 may be used to accumulate and store the data received from bus 1 until the burst is completely received. Propagation of the burst transaction through the bridge from bus 1 to bus 2 is therefore delayed. However, control logic 123 may cause interface logic 122 to set MIWS attribute 320 negative on slave side burst transaction 304 since this transaction can now be performed with no master inserted wait states.

Alternatively, when the received MIWS attribute is positive and indicates a master inserted wait state may occur, the bridge may initiate a respective transaction and simply pass the positive MIWS through and insert master wait states until data for each data phase is available. In this manner, the initiation of the burst is not delayed significantly, but the bridge may need to insert master wait states in the resulting slave side burst transaction.

Figure 4:
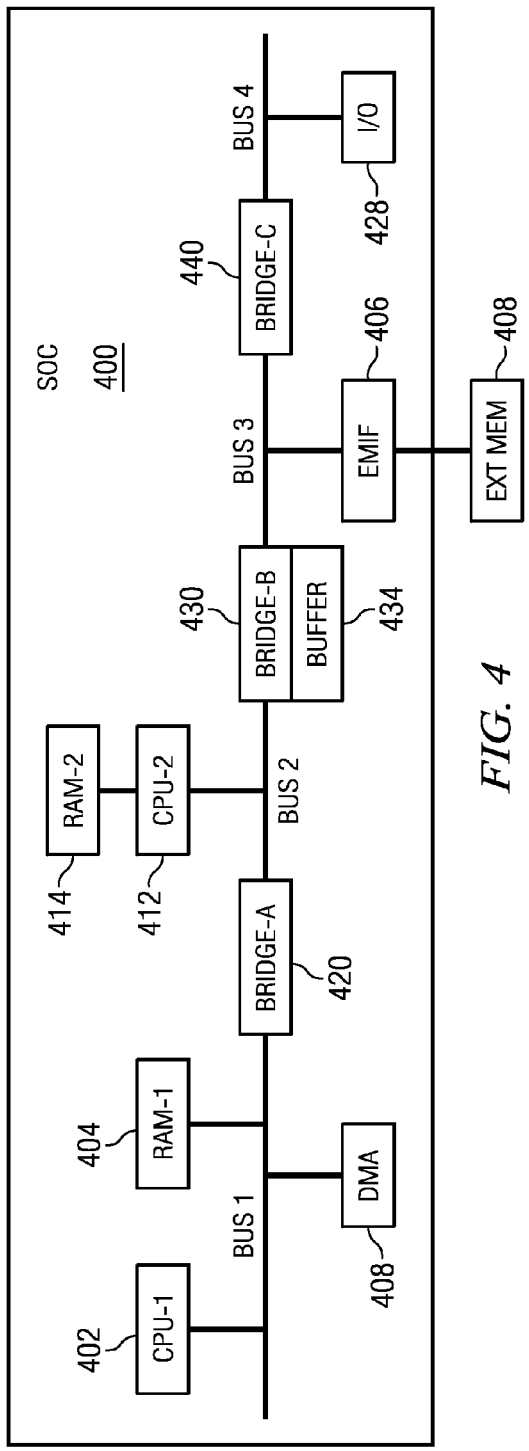
FIG. 4 is a block diagram of a more complex network illustrative of another embodiment of the present invention.

FIG. 4 is a block diagram of a more complex network contained within SOC 400, illustrative of another embodiment of the present invention. Bus 1 interconnects processor 402, local RAM 404 and DMA 410. Bus 2 interconnects processor 412 that has local RAM 414. Bus 3 couples to EMIF 406. EMIF 406 may be coupled to an external memory 408. Bus 4 couples to a selection of input/output devices 428

Bridge-A 420 couples bus 2 to bus 1. Bridge-B couples bus 2 to bus 3. Bridge-C couples bus 3 to bus 4. Each bridge may be implemented to operate in a similar manner as bridge 120 of FIG. 1, such that each has a bridge interface that connects to the address, data, and control signal lines of one bus, while another bridge interface connects to the address, data, and control signal lines of the other bus. Control logic within each bridge controls and coordinates the operation of the bridge interfaces. A buffer, such as buffer 434 may be coupled to the bridge interfaces of a bridge and controlled by control logic of the bridge to provide store and forward buffering, as was described in more detail above.

Note that the block diagram is only intended to illustrate generic network fabric concepts and does not show all of the system components such as an arbiter, decoder etc. In this embodiment, bus 1 supports 32, 64, or 128-bit data-bus implementations with a fixed 32-bit address bus. It is a synchronous bus that supports bursts and pipelining of accesses to improve throughput. Buses 2-4 are similar buses that also support burst transactions. Each bridge acts a slave to transactions generated by a master device on the master side bus and then acts as a master on the slave side bus in response to each received transaction.

Each of the buses may operate at different clock rates. Various embodiments may use a central arbiter or a distributed arbitration system. Every transfer has an address/control phase and a separate data phase.

FIGS. 5-8 are ladder diagrams illustrating various operation scenarios of the network of SOC 400 in FIG. 4. These scenarios are by no means all inclusive, but are merely representative of the many permutations that are possible.

Figure 5:
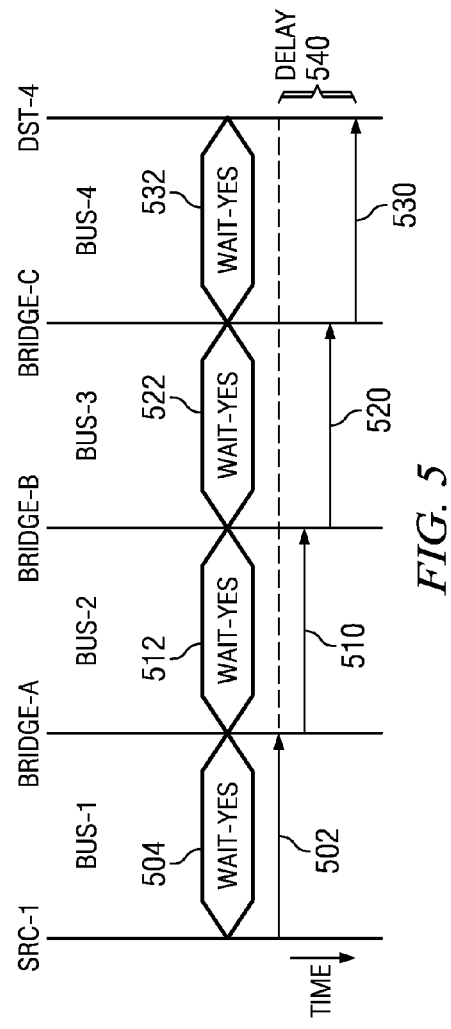
FIGS. 5-8 are ladder diagrams illustrating operation of the network of FIG. 4.

FIG. 5 illustrates a case in which a master source (SRC-1) initiates a burst transaction 502 on bus 1 and includes with the command phase a positive MIWS attribute 504 that indicates a master inserted wait state may occur in the transaction. Bridge-A does not buffer the transaction and passes the transaction on to bus 2 as transaction 510 and includes with the command phase a positive MIWS attribute 522. Bridge-B does not buffer the transaction and passes the transaction on to bus 3 as transaction 520 and includes with the command phase a positive MIWS attribute 522. Bridge-C does not buffer the transaction and passes the transaction on to bus 4 as transaction 530 and includes with the command phase a positive MIWS attribute 532. The transaction then reaches slave destination DST-4 after a delay 540. Slave DST-4 can now receive and process the transaction knowing that no master inserted wait states will occur during the transaction.

Figure 6:
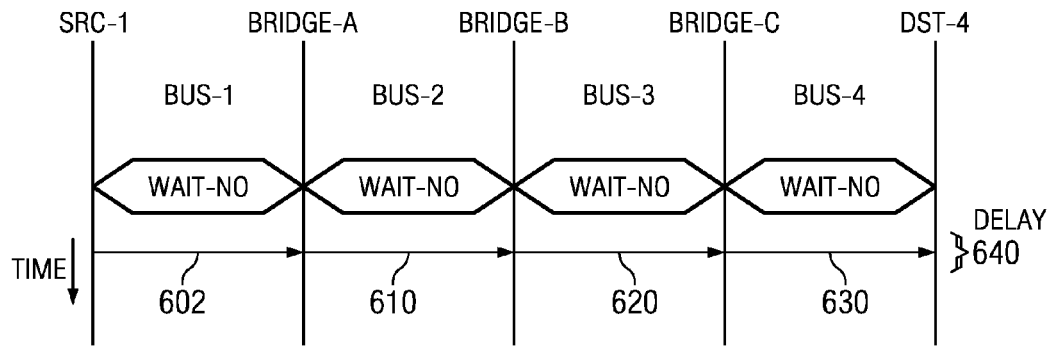

FIG. 6 illustrates a case in which a master source (SRC-1) initiates a burst transaction 602 on bus 1 and includes with the command phase a negative MIWS attribute that indicates a master inserted wait state will not occur in the transaction. Bridge-A then does not buffer the transaction and initiates without delay a cut-through transaction on to bus 2 as transaction 610 and includes with the command phase a negative MIWS attribute. Bridge-B then does not buffer the transaction and initiates without delay a cut-through transaction on to bus 3 as transaction 620 and includes with the command phase a negative MIWS attribute. Bridge-C then does not buffer the transaction and initiates without delay a cut-through transaction on to bus 3 as transaction 630 and includes with the command phase a negative MIWS attribute. The transaction then reaches slave destination DST-4 after a negligible delay 640. Slave DST-4 can now receive and process the transaction knowing that master inserted wait states will not occur during the transaction.

Figure 7:
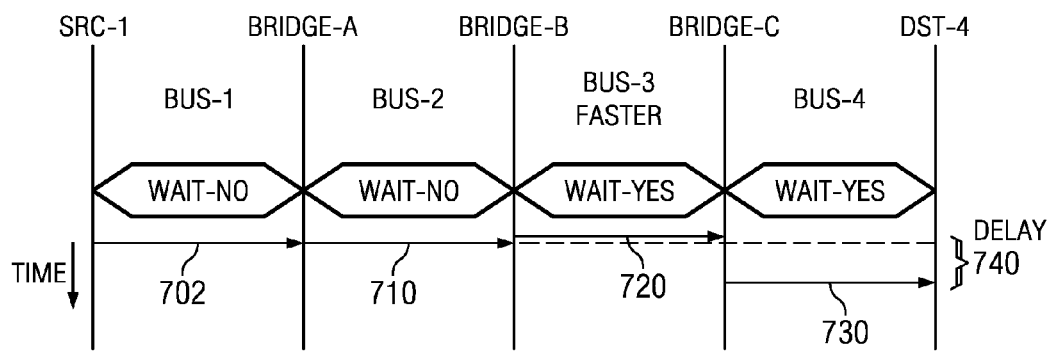

FIG. 7 illustrates a case in which a master source (SRC-1) initiates a burst transaction 702 on bus 1 and includes with the command phase a negative MIWS attribute that indicates a master inserted wait state will not occur in the transaction. Bridge-A then does not buffer the transaction and initiates without delay a cut-through transaction on to bus 2 as transaction 710 and includes with the command phase a negative MIWS attribute. Bridge-B then does not buffer the transaction and initiates without delay a cut-through transaction on to bus 3 as transaction 620. However, bus 3 operates at a faster clock rate than bus 2 and bridge-B therefore cannot complete the transaction without master inserted wait states and includes with the command phase a positive MIWS attribute. Bridge-C does not buffer the transaction and passes the transaction on to bus 4 as transaction 730 and includes with the command phase a positive MIWS attribute. The transaction then reaches slave destination DST-4 after a delay 740. Slave DST-4 can now receive and process the transaction knowing that master inserted wait states may occur during the transaction.

Figure 8:
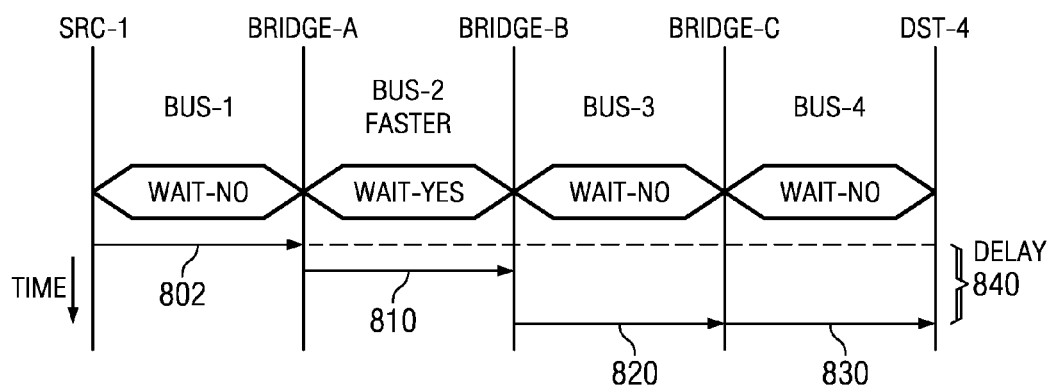

FIG. 8 illustrates a case in which a master source 1 (SRC-1) initiates a burst transaction 802 on bus 1 and includes with the command phase a negative MIWS attribute that indicates a master inserted wait state will not occur in the transaction. Bridge-A then does not buffer the transaction and initiates a transaction on to bus 2 as transaction 810. However, bus 2 operates at a faster clock rate than bus 1 and bridge-B therefore cannot complete the transaction without master inserted wait states and includes with the command phase a positive MIWS attribute. Bridge-B then buffers the transaction in a store and forward buffer 434 and initiates transaction 820 on to bus 3 when all of the data phases have been received. Bridge B includes with the command phase a negative MIWS attribute. Bridge-C then does not buffer the transaction and initiates without delay a cut-through transaction 830 on to bus 4 and includes with the command phase a negative MIWS attribute. The transaction then reaches slave destination DST-4 after a delay 840. Slave DST-4 can now receive and process the transaction knowing that no master inserted wait states will occur during the transaction.

Figure 9:
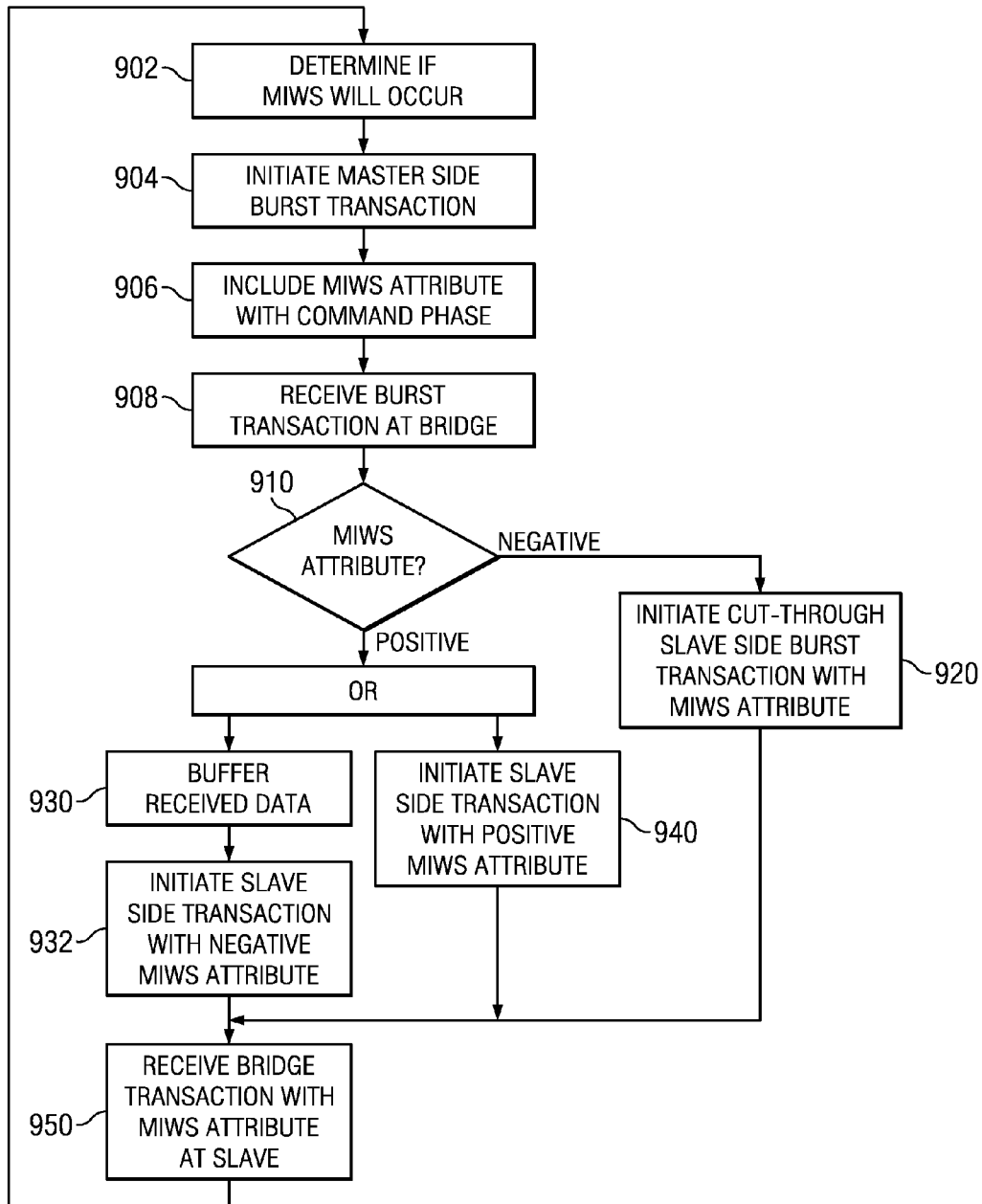
FIG. 9 is flow diagram illustrative of operation of embodiments of the present invention.

FIG. 9 is flow diagram illustrative of operation of embodiments of the present invention. This diagram represents the operation of a single bridge in a network, such as the networks within SOC 100 or SOC 400. When there are multiple bridges, the diagram is repeated for each bridge. For a given master in the network, there is a determination 902 of whether a block of data can be transferred by the master without incurring a master inserted wait state prior to initiating a burst transaction. As discussed earlier, this may done at design time for the master or this may done prior to each transaction performed by the master.

A burst transaction is initiated 904 on a bus by a master coupled to the bus to transfer a block of data as a burst transaction. A master inserted wait state attribute (MIWS) is included 906 with the initiation of the burst transaction that indicates whether a master inserted wait state may or will not occur during the burst transaction. Typically, initiation of the burst transaction is a command transmitted on the bus by the master. The wait state attribute is included with the command.

It may be encoded in the command, or may be a unique bit in a multi-bit command, for example. In another embodiment, the MIWS attribute may be signaled on a dedicated signal line coincident with initiation of the burst transaction. This may be the same signal line that is used to indicate wait states during data phases of the burst transaction, for example.

A bridge that is coupled to the bus receives 908 the burst transaction along with the included MIWS attribute. When the attribute is negative 910 indicating that no master inserted wait states will occur during the burst transaction, a cut-through transaction may be initiated 920 to a second bus with an associated MIWS attribute. In most cases, the slave side MIWS attribute will also be negative indicating that no master inserted wait states will occur during the slave side burst transaction. However, as described with regard to FIG. 7, there may be situations where the slave side MIWS attribute will be set positive indicating that a master inserted wait state may occur during the burst transaction, due to timing constraints, for example.

The block of data received from the burst transaction may be buffered 930 by the bridge when the wait state attribute indicates 910 a master inserted wait state may be incurred during the burst transaction. A slave side burst transaction may then be initiated 932 on the second bus by the bridge to transfer the buffered block of data. A wait state attribute is included with the initiation of the burst transaction on the second bus that indicates a master inserted wait state will not occur during the burst transaction.

Alternatively, a slave side burst transaction may be initiated 940 on the second bus by the bridge to transfer an un-buffered block of data. A wait state attribute is included with the initiation of the burst transaction on the second bus that indicates a master inserted wait state may occur during the burst transaction.

Once the slave side burst transaction has been initiated, it will then be received 950 by a slave interface. This may be another bridge as illustrated in FIG. 4, or it may be the final slave device destination. In either case, the slave interface receives the MIWS attribute and can process the burst transaction accordingly.

System Example

Figure 10:
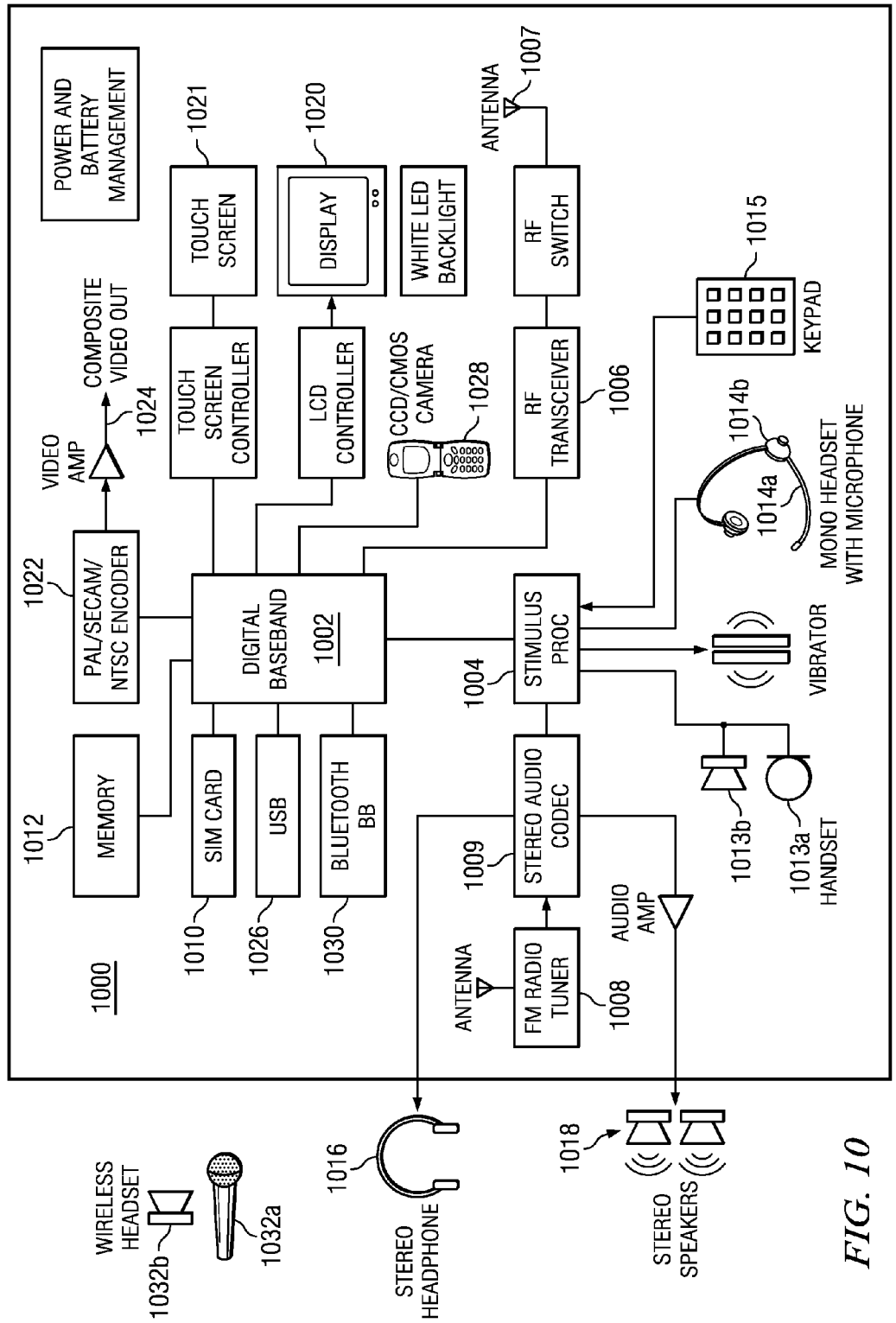
FIG. 10 is block diagram of a system that embodies the present invention.

FIG. 10 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing. Either or both of DBB unit 1002 or SP unit 1004 may be a SOC with embedded interconnect fabrics that utilize a master inserted wait state attribute that is included with initiation of burst transactions to indicate whether a master inserted wait state may or will not occur during the burst transaction, as described in more detail above.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 may also be connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Other Embodiments

Although the invention finds particular application to systems on a chip (SOC) that may include multiple processors and embedded memory, it also finds application to other forms of SOC. The SOC may have just a single processor, or no processor. The SOC may have a large internal memory, or no internal memory subsystems. An SOC may contain one or more modules which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, the on-chip fabric may be more complex than the simple linear arrangements illustrated herein. The fabric may have a ring topology or a star topology, for example. A bridge may have more than two interfaces, in which case the concepts described herein may be applied to any set of interfaces that interact for any given bridged transaction.

While the invention has been described with reference to on-chip interconnect fabrics, embodiments of the invention may also be applied to multichip systems in which bridges or buses couple the multiple chips.

The buses described herein are illustrative. Other embodiments may utilize buses having bit widths and configurations that differ from the bus configurations described herein. Bus signaling may utilize metallic conductors, optical conductors, infrared conduction, or other later discovered conduction technology, for example.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for performing write transactions in an interconnect fabric, the method comprising:
    initiating a burst transaction on a bus by a master coupled to the bus to transfer a block of data as a burst transaction; and
    including a wait state attribute with the initiation of the burst transaction that indicates whether a master inserted wait state may or will not occur during the burst transaction.

2. The method of claim 1, wherein the initiation of the burst transaction comprises a command transmitted on the bus by the master; and wherein the wait state attribute is included with the command.

3. The method of claim 1, wherein the wait state attribute is transmitted by the master on a signal line coincident with initiation of the burst transaction.

4. The method of claim 1, further comprising determining if the block of data can be transferred by the master without incurring a master inserted wait state prior to initiating the burst transaction.

5. The method of claim 1, further comprising:
    receiving the burst transaction initiation and the included wait state attribute by a bridge coupled to the bus, wherein the bridge is also coupled to a second bus; and
    initiating a cut-through transaction to the second bus when the wait state attribute indicates a master inserted wait state will not be incurred during the burst transaction.

6. The method of claim 5, further comprising:
    buffering the block of data from burst transaction by the bridge when the wait state attribute indicates a master inserted wait state may be incurred during the burst transaction;
    initiating a burst transaction on the second bus by the bridge to transfer the buffered block of data; and
    including a wait state attribute with the initiation of the burst transaction on the second bus that indicates a master inserted wait state will not occur during the burst transaction.

7. A method for performing write transactions in an interconnect fabric, the method comprising:
    receiving a burst transaction initiation with an included wait state attribute by a bridge coupled to a bus, wherein the bridge is also coupled to a second bus; and
    initiating a cut-through transaction to the second bus when the wait state attribute indicates a master inserted wait state will not be incurred during the burst transaction.

8. The method of claim 7, further comprising:
    buffering at the bridge a block of data from the burst transaction when the wait state attribute indicates a master inserted wait state may be incurred during the burst transaction;
    initiating a burst transaction on the second bus by the bridge to transfer the buffered block of data; and
    including a wait state attribute with the initiation of the burst transaction on the second bus that indicates a master inserted wait state will not occur during the burst transaction.

9. The method of claim 7, wherein the burst transaction initiation comprises a command received on the bus by the bridge; and wherein the wait state attribute is included with the command.

10. The method of claim 7, wherein the bridge receives a burst transaction with a wait state attribute indicating no master inserted wait states; and wherein the bridge initiates a corresponding burst transaction on the second bus with a wait state attribute indicating the bridge may insert master inserted wait states during the corresponding burst transaction.

11. The method of claim 7, further comprising:
    initiating a burst transaction on the bus by a master coupled to the bus to transfer the block of data as a burst transaction; and
    including a wait state attribute with the initiation of the burst transaction that indicates whether a master inserted wait state may or will not occur during the burst transaction.

12. The method of claim 11, wherein the initiation of the burst transaction comprises a command transmitted on the bus by the master; and wherein the wait state attribute is included with the command.

13. The method of claim 11, wherein the wait state attribute is transmitted by the master on a signal line coincident with initiation of the burst transaction.

14. The method of claim 11, further comprising determining if the block of data can be transferred by the master without incurring a master inserted wait state prior to initiating the burst transaction.

15. A system, comprising:
    an interconnect fabric with at least one bridge coupled to a first bus and to a second bus; and
    one or more master devices coupled to at least the first bus;
    wherein the bridge comprises:
        a first interface configured to receive a burst transaction initiation with an included wait state attribute on the first bus;
        a second interface coupled to the second bus; and
        control logic configured to initiate a cut-through transaction to the second bus when the wait state attribute indicates a master inserted wait state will not be incurred during the burst transaction.

16. The system of claim 15, further comprising buffer logic configured to buffer a block of data from the burst transaction when the wait state attribute indicates a master inserted wait state may be incurred during the burst transaction, wherein the control logic of the bridge is further configured to:
- initiate a burst transaction on the second bus to transfer the buffered block of data; and
- include a wait state attribute with the initiation of the burst transaction on the second bus that indicates a master inserted wait state will not occur during the burst transaction.

17. The system of claim 15, wherein the burst transaction initiation comprises a command received by the first interface from the first bus; and wherein the wait state attribute is included with the command.

18. The system of claim 15, wherein the wait state attribute is received by the first interface from a signal line on the first bus coincident with initiation of the burst transaction.

19. The system of claim 15, wherein the interconnect fabric is comprised within a system on a chip (SOC).

20. The system of claim 19, wherein the system is a cellular handset, further comprising a transceiver coupled to the SOC.

* * * * *